(12) United States Patent
Lafond et al.

(10) Patent No.: US 11,067,208 B2
(45) Date of Patent: Jul. 20, 2021

(54) FLAT FACE FEMALE HYDRAULIC COUPLING

(71) Applicant: EATON S.A.S., Ville-la-Grande (FR)

(72) Inventors: Sebastien Lafond, Habere Lullin (FR); Pritam Sudhakar Lad, Pune (IN)

(73) Assignee: EATON S.A.S., Ville-la-Grande (FR)

( * ) Notice: Subject to any disclaimer, the term of this patent is extended or adjusted under 35 U.S.C. 154(b) by 0 days.

(21) Appl. No.: 16/480,716

(22) PCT Filed: Jan. 26, 2018

(86) PCT No.: PCT/EP2018/052000
§ 371 (c)(1),
(2) Date: Jul. 25, 2019

(87) PCT Pub. No.: WO2018/138286
PCT Pub. Date: Aug. 2, 2018

(65) Prior Publication Data
US 2019/0390810 A1  Dec. 26, 2019

(30) Foreign Application Priority Data

Jan. 27, 2017 (IN) .............................. 201711003111

(51) Int. Cl.
*F16L 37/23* (2006.01)
*F16L 37/34* (2006.01)
*F16L 37/35* (2006.01)

(52) U.S. Cl.
CPC .............. *F16L 37/35* (2013.01); *F16L 37/23* (2013.01); *F16L 37/34* (2013.01)

(58) Field of Classification Search
CPC . F16L 29/02; F16L 37/38; F16L 37/40; F16L 37/413; F16L 37/34; Y10T 137/87949; Y10T 137/87965; Y10T 137/87973
See application file for complete search history.

(56) References Cited

U.S. PATENT DOCUMENTS

| 4,124,228 A | 11/1978 | Morrison |
| 5,179,976 A * | 1/1993 | Boland et al. |
| 5,662,141 A * | 9/1997 | Arosio |

(Continued)

FOREIGN PATENT DOCUMENTS

DE        10351997 A1    6/2005

*Primary Examiner* — Hailey K. Do
(74) *Attorney, Agent, or Firm* — Leydig, Voit & Mayer, Ltd.

(57) ABSTRACT

A flat face female hydraulic coupling includes: a body with a continuous passage extending in an axial direction; a valve stem coaxially arranged in the continuous passage of the body; a valve guide coaxially arranged in the continuous passage of the body, the valve guide being sealed against a surface of the continuous passage, the valve guide including a central passage; and a valve sleeve arranged slidingly in the axial direction between a first position and a second position, the valve sleeve being guided by the valve guide, the valve sleeve being sealed to the valve guide in both the first position and the second position and sealed to the valve stem in the first position, a passage being provided between the valve stem and the valve sleeve in the second position. In the first position of the valve sleeve a fluid chamber is formed.

5 Claims, 3 Drawing Sheets

(56) References Cited

U.S. PATENT DOCUMENTS

| | | | |
|---|---|---|---|
| 2002/0174904 A1 | 11/2002 | Arosio | |
| 2009/0289453 A1* | 11/2009 | Sauer | |
| 2013/0206261 A1* | 8/2013 | Prust et al. | |
| 2015/0377402 A1 | 12/2015 | Boothe et al. | |
| 2016/0369923 A1* | 12/2016 | Danelli et al. | |
| 2018/0328526 A1* | 11/2018 | Laufer et al. | |
| 2019/0003628 A1* | 1/2019 | Laufer et al. | |

\* cited by examiner

FLAT FACE FEMALE HYDRAULIC COUPLING

CROSS-REFERENCE TO PRIOR APPLICATIONS

This application is a U.S. National Phase application under 35 U.S.C. § 371 of International Application No. PCT/EP2018/052000, filed on Jan. 26, 2018, and claims benefit to Indian Patent Application No. IN 201711003111, filed on Jan. 27, 2017. The International Application was published in English on Aug. 2, 2018 as WO 2018/138286 under PCT Article 21(2).

FIELD

The invention relates to a flat face female hydraulic coupling comprising:
a body with a continuous passage extending in axial direction;
a valve stem coaxially arranged in the continuous passage of the body;
a valve guide coaxially arranged in the continuous passage of the body, wherein the valve guide is sealed against the surface of the continuous passage and wherein the valve guide comprises a central passage;
a valve sleeve arranged slidingly in axial direction between a first and a second position, wherein the valve sleeve is guided by the valve guide and wherein the valve sleeve is sealed to the valve guide in both first and second position and is sealed to the valve stem in the first position and a passage is provided between the valve stem and the valve sleeve in the second position;
wherein in the first position of the valve sleeve a fluid chamber is formed by the central passage, the inner surface of the valve sleeve and the valve stem.

BACKGROUND

Such a flat face female hydraulic coupling is known from US 2002 0174904. In this prior art coupling the valve sleeve is composed out of two sleeve parts, which both need to be slid to the second position to open the coupling and allowing for fluid to flow through the coupling.

The valve sleeve has, when seen in a first axial direction, a first frontal axial surface which is in contact with fluid in the coupling. When seen in the opposite second axial direction, the valve sleeve has a second frontal axial surface. Clearly, the size of the first frontal axial surface differs from the size of the second frontal axial surface.

When the female coupling is closed and a pressure is present in the fluid chamber formed by the central passage, the inner surface of the valve sleeve and the valve stem, the difference between the sizes of the first and second frontal axial surface cause a force onto the valve sleeve, which force needs to be overcome when a flat face male hydraulic coupling is inserted into the female coupling. Generally this force prevents manual coupling of a flat face male hydraulic coupling with a female hydraulic coupling. With the couplings according to the prior art, the hydraulic system needs to be shutdown and to be depressurized before the coupling can be made manually.

SUMMARY

In an embodiment, the present invention provides a flat face female hydraulic coupling, comprising: a body with a continuous passage extending in an axial direction; a valve stem coaxially arranged in the continuous passage of the body; a valve guide coaxially arranged in the continuous passage of the body, the valve guide being sealed against a surface of the continuous passage, the valve guide comprising a central passage; and a valve sleeve arranged slidingly in the axial direction between a first position and a second position, the valve sleeve being guided by the valve guide, the valve sleeve being sealed to the valve guide in both the first position and the second position and sealed to the valve stem in the first position, a passage being provided between the valve stem and the valve sleeve in the second position, wherein in the first position of the valve sleeve a fluid chamber is formed by the central passage, an inner surface of the valve sleeve, and the valve stem, and wherein a part of the inner surface of the valve sleeve bordering the fluid chamber has a surface integrated normal vector perpendicular to the axial direction or equal to zero.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
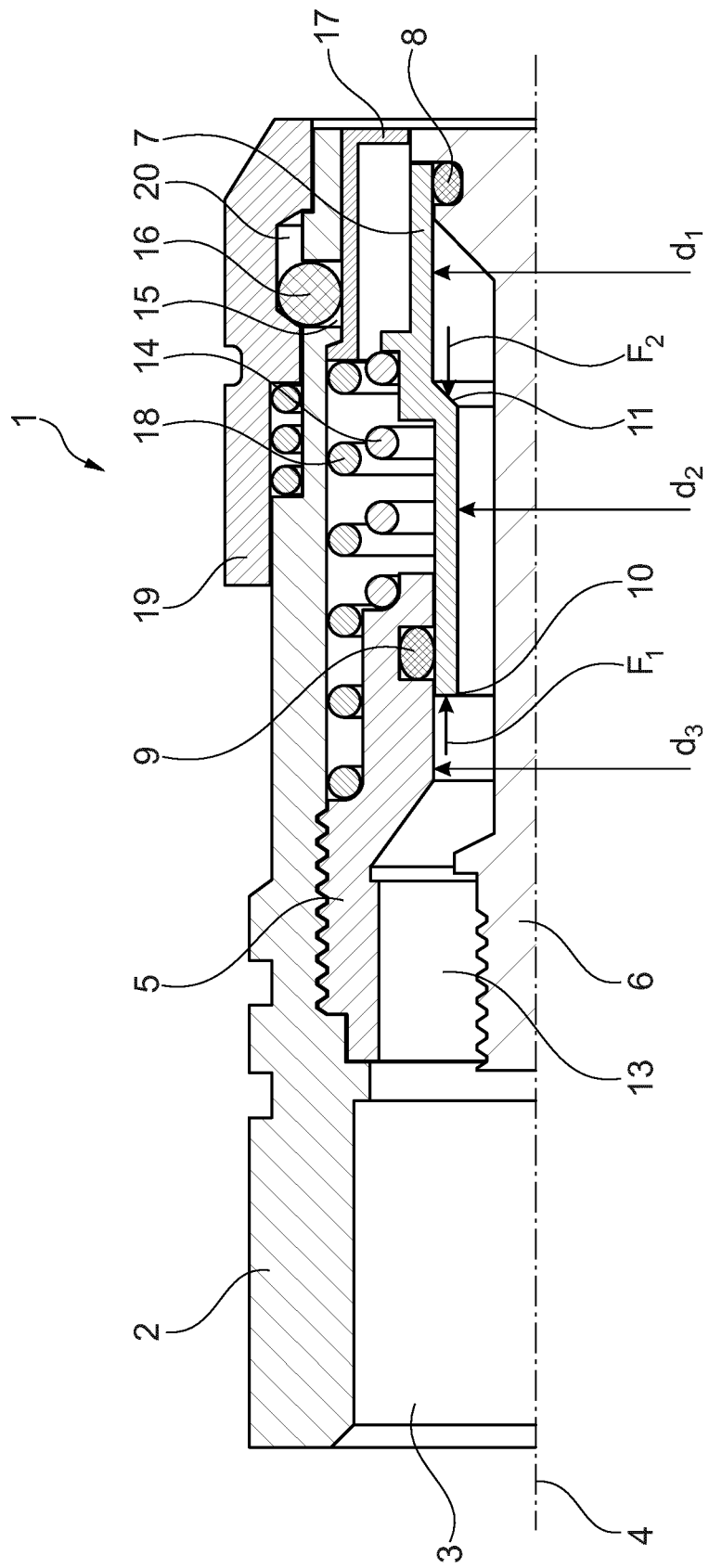
FIG. 1 shows a cross-sectional view of a first embodiment of the flat face female hydraulic coupling according to the invention.

Accordingly, in an embodiment, the present invention reduces or even removes the above mentioned disadvantages.

In an embodiment, the present invention provides a flat face female hydraulic coupling, which flat face female hydraulic coupling is characterized in that the part of the inner surface of the valve sleeve bordering the fluid chamber has a surface integrated normal vector perpendicular to the axial direction or equal to zero.

According to the invention, in basis, the frontal axial surface in both opposite axial directions is made equal to cancel the resulting force due to a difference in size of both frontal axial surfaces. By ensuring that the surface integrated normal vector is perpendicular to the axial direction or is equal to zero, it is ensured that the frontal axial surface in both opposite directions is equal and the resulting force in axial direction, therefore is cancelled.

With the resulting force in axial direction on the valve sleeve being canceled, the flat face female hydraulic coupling can be coupled without effort and therefore manually with a flat face male hydraulic coupling. By having the integrated normal vector perpendicular to the axial direction or equal to zero, the valve sleeve can be slid from the first to the second position, independent of the height of the hydraulic pressure in the fluid chamber.

In an embodiment of the flat face female hydraulic coupling according to the invention a radially extending flange is arranged to the outer surface of the valve sleeve and a spring device is arranged between the radially extending flange and the valve guide to urge the valve sleeve in the first position.

The spring device ensures that when the flat face female hydraulic coupling is decoupled from a male coupling, the valve sleeve is urged to the first position closing fluid passage in the female coupling.

In a preferred embodiment of the flat face female hydraulic coupling according to the invention the valve sleeve has a cylindrical inner surface and the inner surface of the valve sleeve is sealed to the valve stem in the first position and the inner surface of the valve sleeve is sealed to the valve guide.

Using a cylindrical inner surface and sealing both the valve stem and the valve guide to said cylindrical inner surface ensures that the inner surface of the valve sleeve bordering the fluid chamber does not have any axial surface components, which could generate in combination with a fluid pressure in the fluid chamber an axial force.

In another preferred embodiment of the flat face female hydraulic coupling according to the invention the inner surface of the valve sleeve is stepped with a first diameter and a second diameter, wherein the inner surface with the first diameter is sealed to the valve stem, wherein the outer surface of the valve sleeve is sealed to the valve guide, the outer surface having a diameter equal to the first diameter and wherein the first diameter is larger than the second diameter.

In this embodiment the valve guide is sealed to the outer surface of the valve sleeve. By ensuring that the diameter of this outer part is equal to the first diameter of the inner surface, the part of the valve sleeve surface bordering the fluid chamber will have a first frontal axial surface, when seen in a first direction, being equal to a second frontal axial surface when seen in the opposite direction. This ensures that no resulting axial forces are present on the valve sleeve when a hydraulic pressure is present in the fluid chamber.

Yet another embodiment of the flat face female hydraulic coupling according to the invention, further comprises a locking sleeve slidingly arranged between the body and the valve sleeve, at least one radial channel arranged in the body, at least one locking ball arranged in the at least one radial channel and a locking ring slidingly arranged on the outside of the body over the at least one radial channel.

When a male coupling is inserted into the female coupling according to the invention, the locking sleeve is pushed inward releasing the at least one locking ball, which can engage into an outer groove on the male coupling. The locking ring will maintain the locking ball in this locking position until the locking ring is shifted and the locking ball is allowed to move back to its original position.

Preferably, the flat face female hydraulic coupling according to the invention further comprises a second spring device arranged between the locking sleeve and the valve guide to urge the locking sleeve to a position covering the at least one radial channel.

FIG. 1 shows a cross-sectional view of a first embodiment of the flat face female hydraulic coupling 1. This coupling 1 has a body 2 with a continuous passage 3 extending in axial direction 4.

A valve guide 5 is arranged on and sealed to the surface of the continuous passage 3. The valve guide 5 has a central passage 13. A valve stem 6 is furthermore coaxially arranged in the continuous passage 3.

A valve sleeve 7 is arranged slidingly in axial direction. This valve sleeve 7 is sealed on one end with the inner surface by a seal 8 to the valve stem 6 and with the other end with the outer surface by a seal 9 to the valve guide 5.

The valve sleeve 7 has a stepped inner surface with a first diameter $d_1$ and a second diameter $d_2$. The diameter $d_3$ of the outer surface of the valve sleeve 7 is equal to the first diameter $d_1$. The diameter $d_2$ is smaller than $d_1$, such that in one axial direction a frontal axial surface 10 and in the opposite direction a frontal axial surface 11 is formed.

The respective forces F1 and F2 which are generated by a hydraulic pressure in the fluid chamber 12 formed by the central passage 13, the inner surface of the valve sleeve 7 and the valve stem 6, are with respect to their axial component canceling each other out. This allows for the valve sleeve 7 to be moved from the shown first position towards a position in which a passage is created between the valve sleeve 7 and the valve stem 6. Spring device 14 will urge the valve sleeve 7 towards the first position.

The body 2 has a radially extending channel 15 in which a locking ball 16 is arranged. On the inside the locking ball 16 is kept in position by a locking sleeve 17, which is urged by a spring 18. On the outside a slidable locking ring 19 is provided which has a cavity 20 in which the locking ball 16 is partially accommodated.

Figure 2:
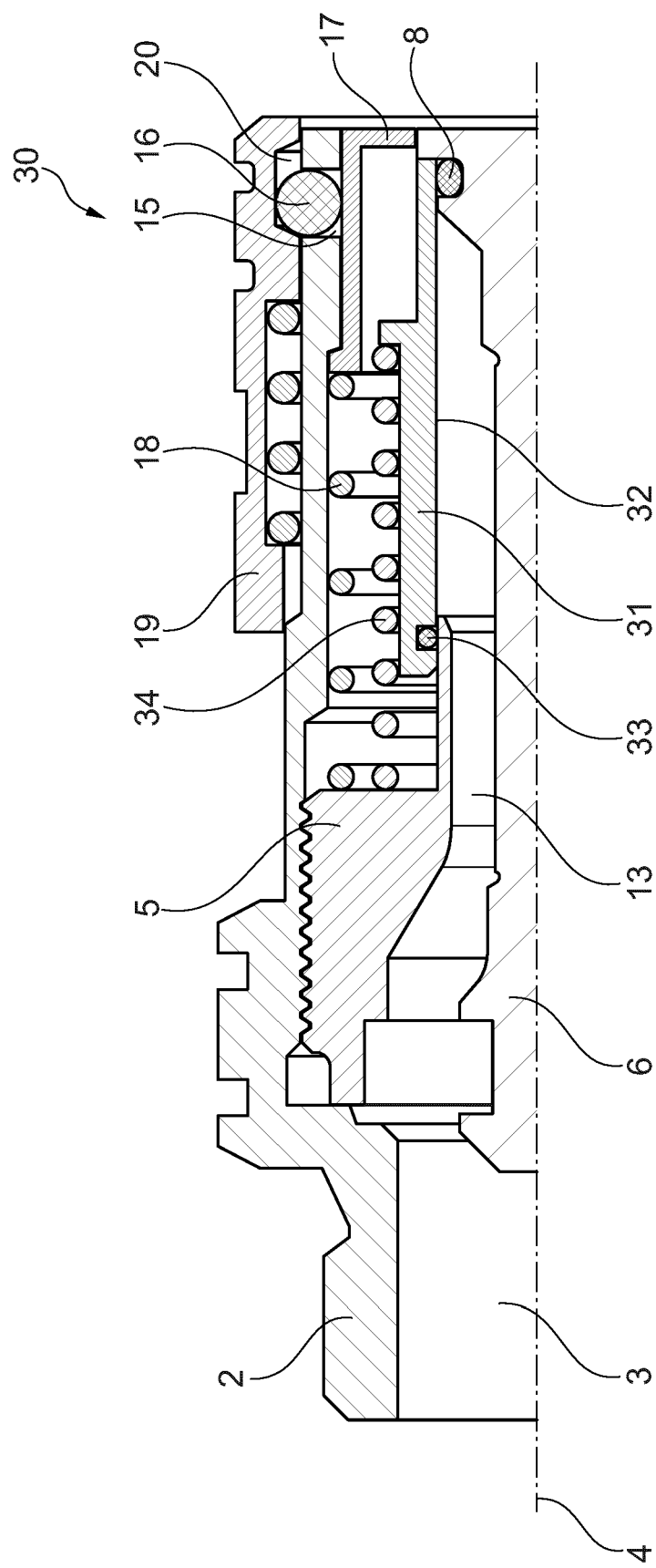
FIG. 2 shows a cross-sectional view of a second embodiment of the flat face female hydraulic coupling according to the invention.

FIG. 2 shows a cross-sectional view of a second embodiment 30 of the flat face female hydraulic coupling according to the invention. This embodiment 30 partially corresponds to the embodiment 1 according to FIG. 1 and as a result similar components are designated with the same reference signs.

The valve sleeve 31 is differently shaped and has a cylindrical inner surface 32. The inner surface 32 of the valve sleeve 31 seals with the seal 8 onto the valve stem 6 on one end and seals also on the inner surface 32 with a seal 33 onto the outside surface of the valve guide 5. The valve sleeve 31 is urged to the closed position by a spring 34.

Because the inner surface 32 of the valve sleeve 31 bordering the fluid chamber 13 is fully cylindrical, no axial surface is present and so no axial force can be generated to counteract the sliding movement of the valve sleeve 31.

Figure 3:
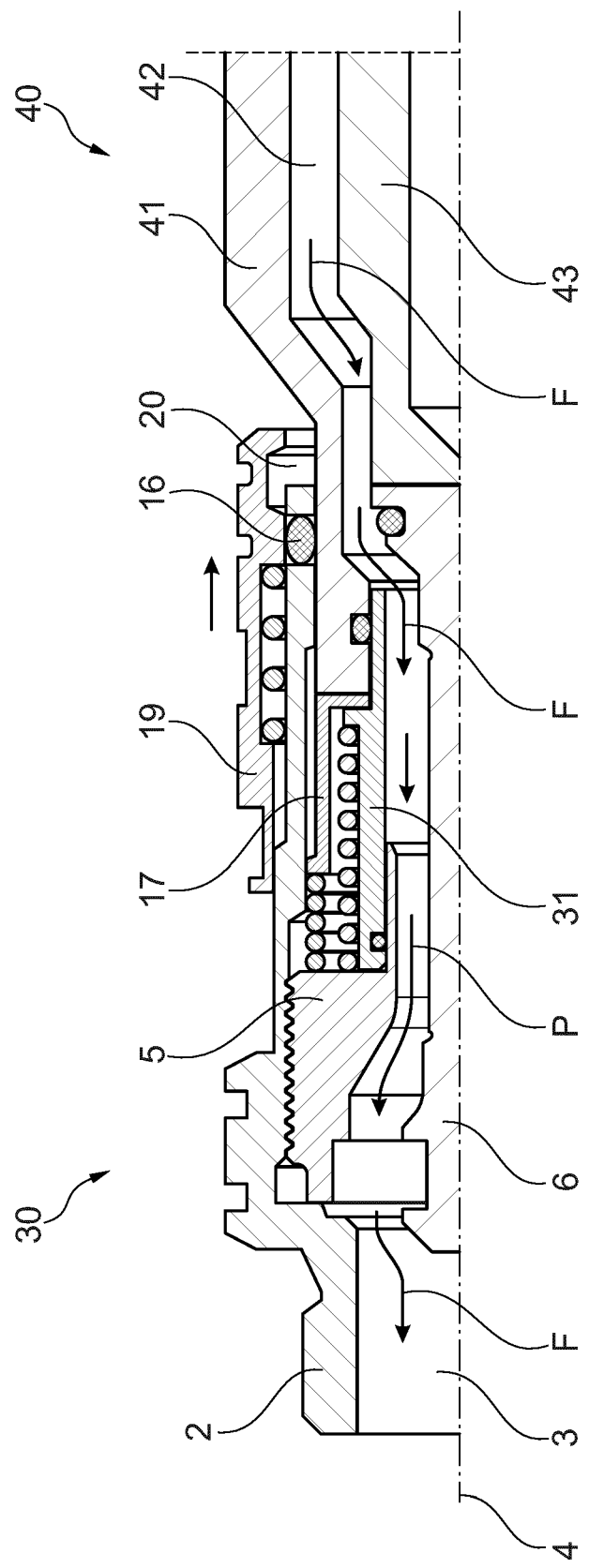
FIG. 3 shows a cross-sectional view of the female coupling according to FIG. 2 coupled to a flat face male hydraulic coupling.

FIG. 3 shows a cross-sectional view of the female coupling 31 according to FIG. 2 coupled to a flat face male hydraulic coupling 40. The male coupling 40 has at least a body 41 with a continuous passage 42 and a valve body 43 axially movable in the continuous passage.

When the body 41 of the coupling 40 is inserted into the female coupling 30, the body 41 will slide the locking sleeve 17 and then the valve sleeve 31 towards the position shown in FIG. 3. At the same time the valve stem 6 will slide the valve body 43 into the male coupling 40. As a result a continuous flow path for fluid F will be created between both couplings 30, 40.

By sliding back the locking sleeve 17, the locking ball is free to move into a circumferential groove in the body 41 of the male coupling 40. At that moment, the locking ring 19 can slide such that the cavity 20 is no longer positioned above the channel with the locking ball 16 causing the locking ball 16 to be locked into the groove of the male coupling 40 and accordingly locking the female coupling 30 and the male coupling 40 together.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A flat face female hydraulic coupling, comprising:
   a body with a continuous passage extending in an axial direction;
   a valve stem coaxially arranged in the continuous passage of the body;
   a valve guide coaxially arranged in the continuous passage of the body, the valve guide being sealed against a surface of the continuous passage, the valve guide comprising a central passage; and
   a valve sleeve arranged slidingly in the axial direction between a first position and a second position, the valve sleeve being guided by the valve guide, the valve sleeve being sealed to the valve guide in both the first position and the second position and sealed to the valve stem in the first position, a passage being provided between the valve stem and the valve sleeve in the second position,
   wherein in the first position of the valve sleeve a fluid chamber is formed by the central passage, an inner surface of the valve sleeve, and the valve stem,
   wherein a part of the inner surface of the valve sleeve bordering the fluid chamber has a surface integrated normal vector perpendicular to the axial direction or equal to zero,
   wherein the inner surface of the valve sleeve is stepped with a first portion having a first diameter and a second portion having a second diameter,
   wherein the first portion is sealed to the valve stem, and
   wherein a portion of an outer surface of the valve sleeve is sealed to the valve guide, the portion of the outer surface having a diameter equal to the first diameter.

2. The flat face female hydraulic coupling according to claim 1, further comprising:
   a radially extending flange arranged on the outer surface of the valve sleeve; and
   a spring arranged between the radially extending flange and the valve guide, the spring being configured to urge the valve sleeve into the first position.

3. The flat face female hydraulic coupling according to claim 1,
   wherein the first diameter is larger than the second diameter.

4. The flat face female hydraulic coupling according to claim 1, further comprising:
   a locking sleeve slidingly arranged between the body and the valve sleeve;
   at least one radial channel arranged in the body;
   at least one locking ball arranged in the at least one radial channel; and
   a locking ring slidingly arranged on an outside of the body over the at least one radial channel.

5. The flat face female hydraulic coupling according to claim 4, further comprising:
   a second spring arranged between the locking sleeve and the valve guide, the second spring being configured to urge the locking sleeve to a position covering the at least one radial channel.

* * * * *